May 19, 1931.  C. COULOMBE  1,805,807
VALVE MECHANISM OIL JACKET
Filed April 17, 1930
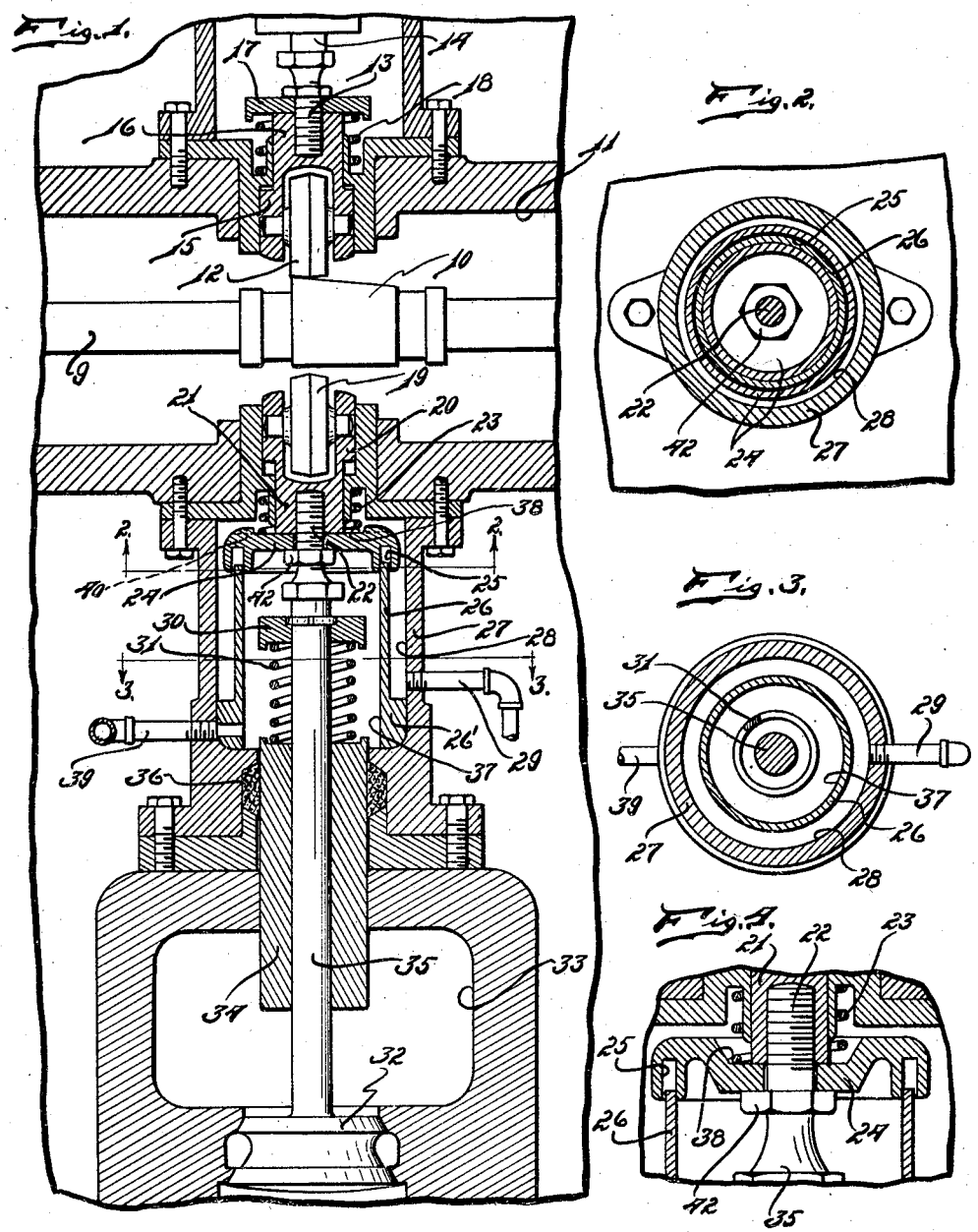
INVENTOR.
Charles Coulombe
BY
Thos. J. Donnelly
ATTORNEY.

Patented May 19, 1931

1,805,807

UNITED STATES PATENT OFFICE

CHARLES COULOMBE, OF DETROIT, MICHIGAN

VALVE MECHANISM OIL JACKET

Application filed April 17, 1930. Serial No. 445,013.

My invention relates to a new and useful improvement in a valve mechanism oil jacket adapted for use primarily on reciprocating steam engines in which the control valves are actuated by a cam shaft rotating in a lubricant bath. With a reciprocating engine of this class, as now used, the valves are rocked to open position by a cam which is rotating in the presence of a lubricant and a considerable quantity of the lubricant is lost and wasted through a passage of the lubricant into the chamber in which escaped steam condenses, then requiring the draining off of the lost lubricant with the condensation. It is an object of the present invention to provide a structure whereby the escaped lubricant may be salvaged and whereby its co-mingling with the condensing steam will be prevented.

Another object of this invention is the provision in a mechanism of this class of a structure whereby there is provided a collecting chamber for the escaped lubricant and a condensing chamber for the escaped steam, these chambers being non-communicating with each other so that the draining of either chamber may be effectively prevented.

Another object of the present invention is the provision of a device of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical view of the invention showing it applied to a machine illustrated in fragment.

Fig. 2 is a view taken on line 2—2 of Fig. 1.

Fig. 3 is a view taken on line 3—3 of Fig. 2.

Fig. 4 is a central sectional view through the deflecting plate used in the invention.

In the drawings I have illustrated the invention used with an engine having a horizontally disposed cam shaft 9 on which is mounted a cam 10. In the construction of engines to which the invention is especially adapted, the cylinders may be arranged in units and it will appear obvious from the description that the invention is adapted for use on each of the units. This cam shaft 9 rotates in a chamber 11 which is maintained filled with oil or a suitable lubricant. A roller 12 which is mounted on the forks 15 of the head 16, engages the cam 10, this head 16 is secured to the threaded portion 13 of the valve stem 14 and a suitable engagement washer 17 is mounted on the threaded portion 13 for engaging the spring 18. This structure is of a well known type and is merely described for the purpose of identifying the structure and use of the invention.

A roller 19 mounted between the forks 20 of the head 21 is also engaged between the cam 10. This head 21 is secured by the screw bolt 22 to an oil deflecting plate 24 which is provided on one face with the outwardly projecting peripheral flange having the groove 25 formed therein. A spring 23 engages, at one end, a stationary part of the engine head and at the other end the oil deflecting plate 24 so as to retain the screw head 42 in engagement with the end of the valve stem 35, thus preventing a rattle or noisy operation when the device is operated. The groove 25 engages the open end of the cylinder 26 which is embraced by the neck 27 and in spaced relation thereto excepting at its lower end which is provided with the peripheral boss 26' which is a snug fit in the neck 27. By maintaining the cylinder 26 in spaced relation to the neck 27 an oil collecting chamber 28 is provided communicating with the lower end of which is the drain pipe 29. Fixedly mounted on the valve stem 35 is the washer 30 which engages one end of the spring 31, the other end of which engages the guide bushing 34, the spring 31 serving to normally maintain the steam control valve 32 in closed position so as to control communication of the chamber 33 with the steam cylinder. This guide member 34 projects through the packing 36. The interior of the cylinder 26 forms a chamber 37 in which may collect the condensation of such steam as may escape into the chamber 37 from the chamber 33. A drain pipe 39 communicates with the chamber 37.

The deflecting plate is dished out, as at 38, on its upper surface so as to prevent lateral displacement of the spring 23. Radially extending channels 40 are formed on the upper surface of the deflecting plate 24 to permit the passage of oil which may collect thereon into the chamber 28. The deflecting plate 24 is securely held against the nut 42 which is threaded on the portion 22 by the head 21 so that seepage of oil through the opening formed in the plate 24 is prevented.

In operation, when the cam 10 forces the head 21 downwardly to open the valve 32, oil will seep around the head 21 so as to escape from the chamber 11 and the present invention affords a means for preserving this oil which leaks through. In a multi-cylinder machine, this oil amounts to a considerable quantity every 24 hours so that from a stand-point of economy alone, the invention is quite desirable. By preventing the oil entering to a position where it may become comingled with the steam or condensate a more efficient operating mechanism is provided and more satisfactory results generally obtained in the operation of such a machine.

The construction, it will be noted, entirely separates the oil collecting chamber from the condensate chamber or the chamber into which escaping steam would pass.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. In combination: an engine having a steam chest communicable through a port with a cylinder; a lubricant chamber positioned above said steam chest; a cam shaft rotating in said lubricant chamber; a valve for closing said port; a spring for normally retaining said valve in closed position; cams on said cam shaft; a push mechanism projected through said steam chest and operable through engagement with a cam on said cam shaft for moving said valve to open position; a cylinder positioned in embracing relation to a portion of said push mechanism positioned above said steam chest to provide a condensate chamber for reception of condensate resulting from steam escaping thereinto from said steam chest; and a conduit for delivering condensate from said condensate chamber.

2. In combination: an engine having a steam chest communicable through a port with a cylinder; a lubricant chamber positioned above said steam chest; a cam shaft rotating in said lubricant chamber; a valve for closing said port; a spring for normally retaining said valve in closed position; cams on said cam shaft; a push mechanism projected through said steam chest and operable through engagement with a cam on said cam shaft for moving said valve to open position; a cylinder positioned in embracing relation to a portion of said push mechanism positioned above said steam chest to provide a condensate chamber for reception of condensate resulting from steam escaping thereinto from said steam chest; and a conduit for delivering condensate from said condensate chamber; a cylindrical neck embracing said cylinder and spaced therefrom to provide an oil chamber for reception of oil escaping from said lubricant chamber around said push mechanism.

3. In combination: an engine having a steam chest communicable through a port with a cylinder; a lubricant chamber positioned above said steam chest; a cam shaft rotating in said lubricant chamber; a valve for closing said port; a spring for normally retaining said valve in closed position; cams on said cam shaft; a push mechanism projected through said steam chest and operable through engagement with a cam on said cam shaft for moving said valve to open position; a cylinder positioned in embracing relation to a portion of said push mechanism positioned above said steam chest to provide a condensate chamber for reception of condensate resulting from steam escaping thereinto from said steam chest; and a conduit for delivering condensate from said condensate chamber; a cylindrical neck embracing said cylinder and spaced therefrom to provide an oil chamber for reception of oil escaping from said lubricant chamber around said push mechanism; deflecting means for deflecting said escaping oil into said oil chamber.

4. In combination: an engine having a steam chest communicable through a port with a cylinder; a lubricant chamber positioned above said steam chest; a cam shaft rotating in said lubricant chamber; a valve for closing said port; a spring for normally retaining said valve in closed position; cams on said cam shaft; a push mechanism projected through said steam chest and operable through engagement with a cam on said cam shaft for moving said valve to open position; a cylinder positioned in embracing relation to a portion of said push mechanism positioned above said steam chest to provide a condensate chamber for reception of condensate resulting from steam escaping thereinto from said steam chest; and a conduit for delivering condensate from said condensate chamber; a cylindrical neck embracing said cylinder and spaced therefrom to provide an oil chamber for reception of oil escaping from said lubricant chamber around said push mechanism; deflecting means for deflecting said escaping oil into said oil chamber; and a conduit for delivering oil from said oil chamber.

5. In combination: an engine having a steam chest communicable through a port with a cylinder; a lubricant chamber positioned above said steam chest; a cam shaft rotating in said lubricant chamber; a valve for closing said port; a spring for normally retaining said valve in closed position; cams on said cam shaft; a push mechanism projected through said steam chest and operable through engagement with a cam on said cam shaft for moving said valve to open position; a cylinder positioned in embracing relation to a portion of said push mechanism positioned above said steam chest to provide a condensate chamber for reception of condensate resulting from steam escaping thereinto from said steam chest; and a conduit for delivering condensate from said condensate chamber; a peripheral boss on said cylinder adjacent its lower end; a cylindrical neck concentrically arranged in embracing relation to said cylinder and closely engaging at its inner surface the periphery of said boss, the upper portion of said cylinder being spaced from said neck to provide an escaped lubricant receiving chamber for reception of lubricant escaping from said lubricant chamber around said push mechanism.

6. In combination: an engine having a steam chest communicable through a port with a cylinder; a lubricant chamber positioned above said steam chest; a cam shaft rotating in said lubricant chamber; a valve for closing said port; a spring for normally retaining said valve in closed position; cams on said cam shaft; a push mechanism projected through said steam chest and operable through engagement with a cam on said cam shaft for moving said valve to open position; a cylinder positioned in embracing relation to a portion of said push mechanism positioned above said steam chest to provide a condensate chamber for reception of condensate resulting from steam escaping thereinto from said steam chest; and a conduit for delivering condensate from said condensate chamber; a peripheral boss on said cylinder adjacent its lower end; a cylindrical neck concentrically arranged in embracing relation to said cylinder and closely engaging at its inner surface the periphery of said boss, the upper portion of said cylinder being spaced from said neck to provide an escaped lubricant receiving chamber for reception of lubricant escaping from said lubricant chamber around said push mechanism; a deflecting member positioned within said neck; a flange projecting from the lower face of said deflecting member adjacent its periphery and provided with a groove for the reception of the upper edge of said cylinder, said deflecting member being of less diameter than the inside diameter of said neck.

7. In combination: an engine having a steam chest communicable through a port with a cylinder; a lubricant chamber positioned above said steam chest; a cam shaft rotating in said lubricant chamber; a valve for closing said port; a spring for normally retaining said valve in closed position; cams on said cam shaft; a push mechanism projected through said steam chest and operable through engagement with a cam on said cam shaft for moving said valve to open position; a cylinder positioned in embracing relation to a portion of said push mechanism positioned above said steam chest to provide a condensate chamber for reception of condensate resulting from steam escaping thereinto from said steam chest; and a conduit for delivering condensate from said condensate chamber; a peripheral boss on said cylinder adjacent its lower end; a cylindrical neck concentrically arranged in embracing relation to said cylinder and closely engaging at its inner surface the periphery of said boss, the upper portion of said cylinder being spaced from said neck to provide an escaped lubricant receiving chamber for reception of lubricant escaping from said lubricant chamber around said push mechanism; a deflecting member positioned within said neck; a flange projecting from the lower face of said deflecting member adjacent its periphery and provided with a groove for the reception of the upper edge of said cylinder, said deflecting member being of less diameter than the inside diameter of said neck; and a conduit communicating with said escaped lubricant receiving chamber for conducting therefrom lubricant which may accumulate therein.

In testimony whereof I have signed the foregoing specification.

CHARLES COULOMBE.